United States Patent
Moroney et al.

(10) Patent No.: US 6,813,041 B1
(45) Date of Patent: *Nov. 2, 2004

(54) METHOD AND APPARATUS FOR PERFORMING LOCAL COLOR CORRECTION

(75) Inventors: Nathan Moroney, Mountain View, CA (US); Irwin Sobel, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,162

(22) Filed: Mar. 31, 2000

(51) Int. Cl.$^7$ .............................. H04N 1/60; G06T 5/00; G06F 1/02

(52) U.S. Cl. ...................... 358/1.9; 358/518; 358/521; 358/519; 358/523; 382/263; 382/167; 708/277

(58) Field of Search ....................... 358/1.9, 518, 3.16, 358/517, 515, 3.06, 519, 521, 530, 532, 3.27, 523; 382/167, 162, 254, 260, 264; 708/277

(56) References Cited

U.S. PATENT DOCUMENTS

| | | | |
|---|---|---|---|
| 4,847,654 A | * | 7/1989 | Honma et al. .............. 358/300 |
| 5,189,529 A | * | 2/1993 | Ishiwata et al. ............ 358/451 |
| 5,282,036 A | | 1/1994 | Worley, Jr. et al. |
| 5,793,855 A | | 8/1998 | Peck |
| 6,028,957 A | | 2/2000 | Hada et al. |
| 6,275,304 B1 | * | 8/2001 | Eschbach et al. ........... 358/1.9 |
| 2002/0186387 A1 | * | 12/2002 | Moroney et al. ............ 358/1.9 |

OTHER PUBLICATIONS

Moroney, "Local Color Correction Using Non–Linear Masking", IS&T SID 8th Color Imaging Conference, 2000.*

Myler et al., The Image Processing Algorithms in C, 1993, Prentice Hall P T R, pp 64–65; 82–84; 144; 220.*

Skarabot A. et al.: "Image sequence processing for videowall visualization" Nonlinear Image Processing XI, San Jose, Ca USA Jan. 24–25, 2000, vol. 3961, pp. 138–147, XP008016925.

Jain A K: "Fundamentals of Digital Image Processing" Fundamentals of Digital Image Processing Prentice–Hall International, Inc, US 1989, pp. 249–250, 264, XP002185234.

Chittineni C B: "Single Filters for Combined Imagne Geometric Manipulation and Enchancement" Proceedings of the SPIE, SPIE, Bellingham, Va, US, vol. 1903, Feb. 3, 1993, pp. 111–121, XP001028080.

* cited by examiner

*Primary Examiner*—Scott Rogers (57) ABSTRACT

The invention is directed towards method and apparatus for performing local color correction. One embodiment of the invention is a two-part process. The first part derives an image mask from an input image. In some embodiments, the mask is an inverted, low-pass filtered, monochrome version of the input image. The second part combines the derived mask with the input image through a non-linear operation. In some embodiments, the combination operation is a variable exponential function that has the mask values as part of its exponent and the pixel values as part of its base.

26 Claims, 7 Drawing Sheets

METHOD AND APPARATUS FOR PERFORMING LOCAL COLOR CORRECTION

The present invention is directed towards method and apparatus for performing local color correction.

BACKGROUND OF THE INVENTION

Color tone reproduction is an important aspect of image processing. Historically, tone correction has been performed on a global basis for a given image. Global tone-correction operations traditionally apply the same correction to all the pixels of an image. In other words, they are one-dimensional operations that map each input value to one and only one output value.

Global tone correction results in a reasonable correction when the dynamic range of the original image is fairly limited. When the original image has a large dynamic range, it becomes increasingly difficult to perform a global tone correction that will accommodate both shadow and highlight detail.

Consequently, several local tone-correction operations have been proposed for processing images with high dynamic range. A local tone-correction operation typically maps one input value to different output values, depending on the values of the neighboring pixels. This allows for simultaneous shadow and highlight adjustments.

Prior art local-tone correction techniques include manual operations, such as dodging and burning, and automated techniques, such as histogram equalization, piece-wise gamma correction, and Retinex algorithms. These techniques have shown considerable promise. Some of these techniques, however, are quite complex and time consuming. Others do not consistently provide acceptable quality. Therefore, there is a need in the art for a local tone correction technique that is simple and fast, and that produces high quality images.

SUMMARY OF THE INVENTION

The invention is directed towards method and apparatus for performing local color correction. One embodiment of the invention is a two-part process. The first part derives an image mask from an input image. In some embodiments, the mask is an inverted, low-pass filtered, monochrome version of the input image. The second part combines the derived mask with the input image through a non-linear operation. In some embodiments, the combination operation is a variable exponential function that has the mask values as part of its exponent and the pixel values as part of its base.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

The invention is directed towards method and apparatus for performing local color correction. In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 1:
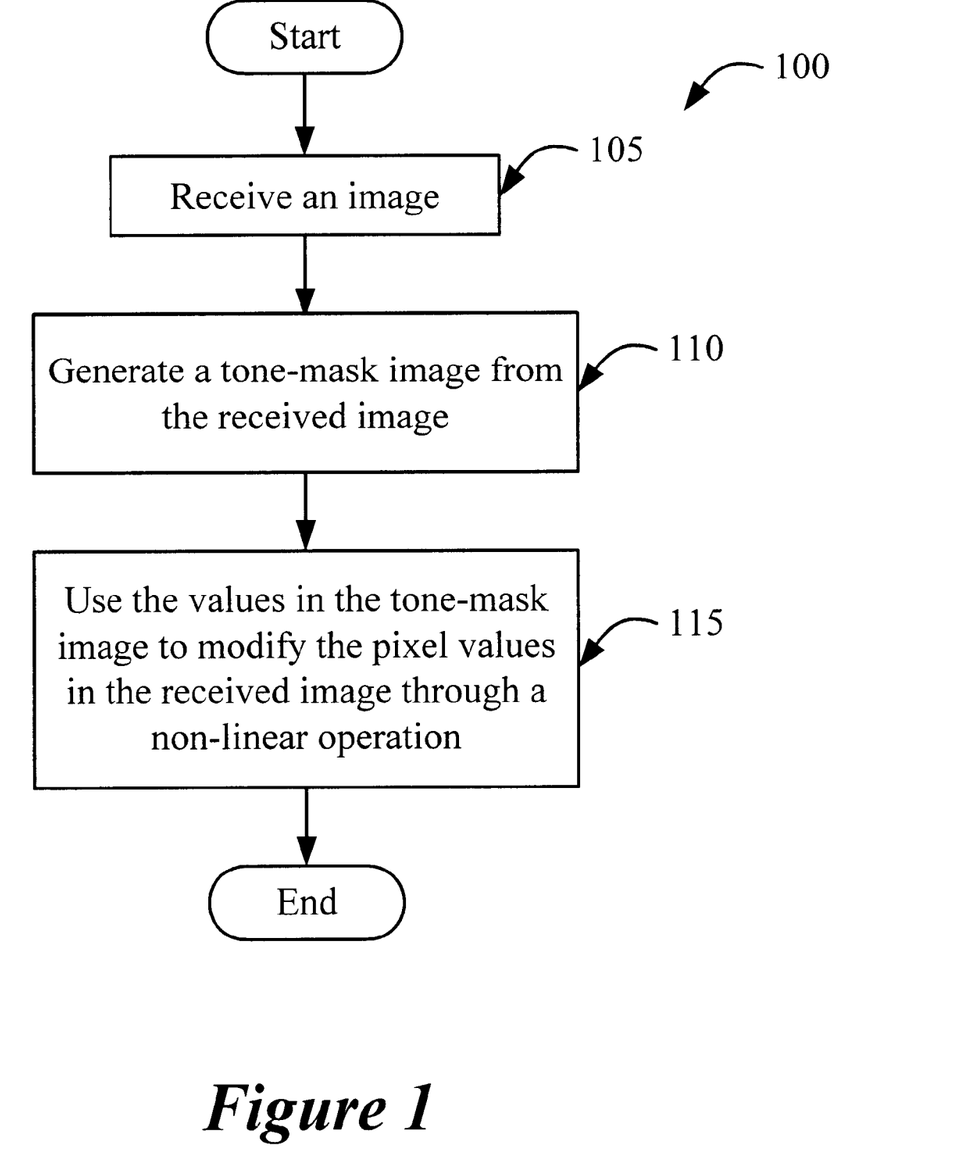
FIG. 1 illustrates a local-color correction process that is used in some embodiments of the invention.

FIG. 1 illustrates a process 100 that is used in some embodiments of the invention. As shown in this figure, the process 100 initially receives (at 105) a digital color image that is formed by a number of pixels (ie., picture elements). Specifically, in some embodiments, the process receives sets of component color values that represent the digital color image. Each set of the component color values specifies the color of a pixel of the digital image. In some embodiments of the invention, the component colors are the primary additive colors, red, green or blue ("RGB"). Other embodiments, however, use other component colors values (such as CMYK values, YCrCb values, CIELAB, CIECAM97s values, etc.) to specify the colors of the digital image's pixels.

As shown in FIG. 1, the process generates (at 110) a tone mask from the received digital image. A tone mask is an image that encodes the tone properties of the received digital image in an abbreviated form. In other words, the mask contains information about the color tone of the items in the received image, independent of the content or identity of the items. The numerical values in the tone mask are indicative of shadows, highlights, and midtones in the received digital image.

Like the received digital image, the tone-mask image includes a number of pixels. The color of each pixel in the tone-mask is specified by a mask color value. Each pixel in the tone-mask image corresponds to a pixel in the digital image. Similarly, the mask color value of each pixel in the tone mask is associated with the component color values of the corresponding pixel in the digital image.

Different embodiments of the invention use different techniques to generate the tone mask of the received digital image. Some embodiments generate this mask by performing an iterative operation on the received image. For instance, some embodiments generate the mask by using an iterative process (such as a Retinex process) that makes assumptions about the human visual system. Other embodiments generate this mask by performing a non-iterative operation on the received image. For example, some embodiments perform a low-pass filtering operation on the received image to generate this mask. One such approach is described below by reference to FIG. 2.

As shown in FIG. 1, after process 100 generates the tone-mask image, the process uses (at 115) the values in the tone mask to modify the pixel color values in the received image through a non-linear operation. The non-linear combination of the mask values with the pixel color values is in contrast to previous techniques that combine the pixel and mask values through linear addition or subtraction operation. The non-linear application of the mask provides a gradual transition for the high contrast boundaries in the received image.

Different embodiments of the invention use different non-linear operations to modify the pixel color values with the mask values. Some embodiments use rotated, scaled sinusoidal functions, while others use sigmoidal functions. Yet other embodiments employ exponential functions that have the mask values as part of their exponent and the pixel values as part of their base. One such exponential operator is described further below by reference to FIG. 3.

Figure 2:
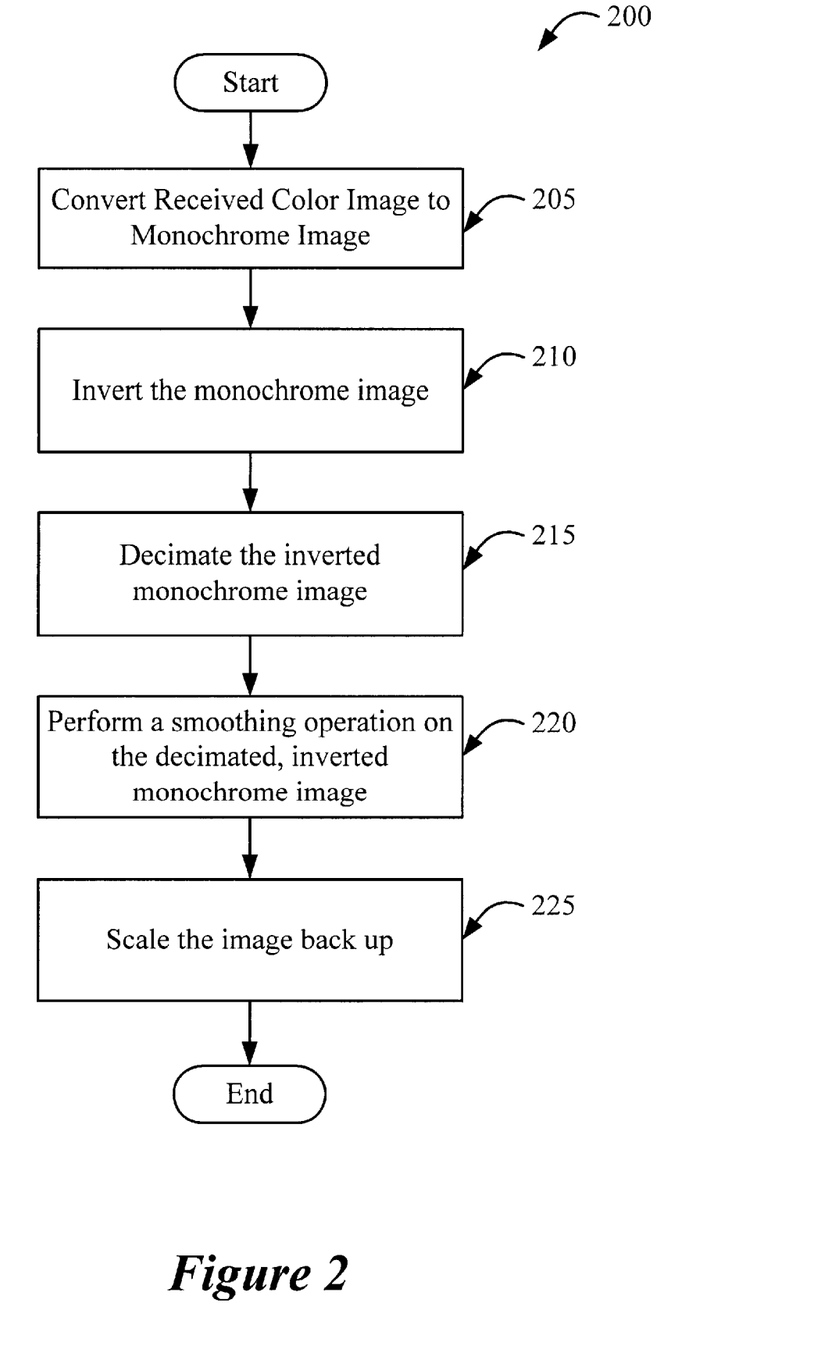
FIG. 2 illustrates a process for generating a tone mask through a low-pass filtering operation.

FIG. 2 illustrates a process 200 for generating a tone mask through a low-pass filtering operation. As shown in this figure, the process initially converts (at 205) the received color image to a monochrome image (i.e., an image that only contains black and white pixel values, or contains black, white, and gray values). One way of generating a monochrome image would be to use the color values for one color component (e.g., for green) and discard the remaining color values. Another approach would be to compute a non-linear average of the component color values by using a scaling equation (such as 0.2R+0.7G+0.1B).

Next, the process inverts (at 210) the monochrome image. In other words, the process subtracts each pixel value from the maximum digital count, so that white values become black values, black values becomes white values, most gray values assume new gray values, and the mid-gray value remains the same. The process then decimates (at 215) the inverted monochrome image. Some embodiments decimate this image by selecting every $n^{th}$ (e.g., $20^{th}$) horizontal and vertical pixel in this image (i.e., selecting the pixel color value for every $n^{th}$ pixel in the horizontal and vertical directions), and discarding the remaining pixels.

The process then performs (at 220) a smoothing operation on each pixel in the decimated, inverted, monochrome image. In some embodiment, this smoothing operation is a 3×3 convolution operation with a ⅑ kernel. In essence, such a convolution operation would replace each pixel value by the average value that is obtained by averaging a 3×3 pixel-neighborhood around the pixel.

Finally, the process scales (at 225) the smoothed, decimated, inverted, monochrome image back up to the resolution of the original received image. In some embodiments, the process performs this scaling operation by selecting each pixel value in the smoothed, decimated, inverted image as the pixel value for a n by n (e.g., 20 by 20) pixel area. The combination of the decimation, smoothing, and scaling operations provide the low-pass filtering operation of the process 200. The result is a tone mask in which there are no fine details and only large indistinct regions are visible.

The mask produced by process 200 is monochrome in order to avoid distorting the chroma of the image. This mask is inverted so that the power of the exponent for the combination operation is the opposite of the input value. For example, a light region in the received image will have a darker mask value (i.e., a higher mask value) and therefore will be darkened. Other embodiments of the invention do not invert the original image to generate the tone mask. Instead, these embodiments account for the need for inversion in the non-linear operator that is used to combine the mask with the received image.

In addition, the mask is decimated and then smoothed in order to speed up the process for generating the mask. Some embodiments of the invention, however, do not decimate the inverted monochrome image to generate a thumbnail image that can be quickly smoothed. Instead, these embodiments perform the smoothing operation directly on the inverted monochrome image.

The mask produced by process 200 is low-pass filtered (i.e., blurred) because otherwise the mask would flatten the contrast in the image. In other words, when the mask image is not blurred, then the non-linear combination of the mask and the received image will result in an image with a reduced image contrast. On the other hand, if the mask is overly blurred, then the invention's process reduces to simple gamma correction, and the local tone correction has less of an effect.

Figure 3:
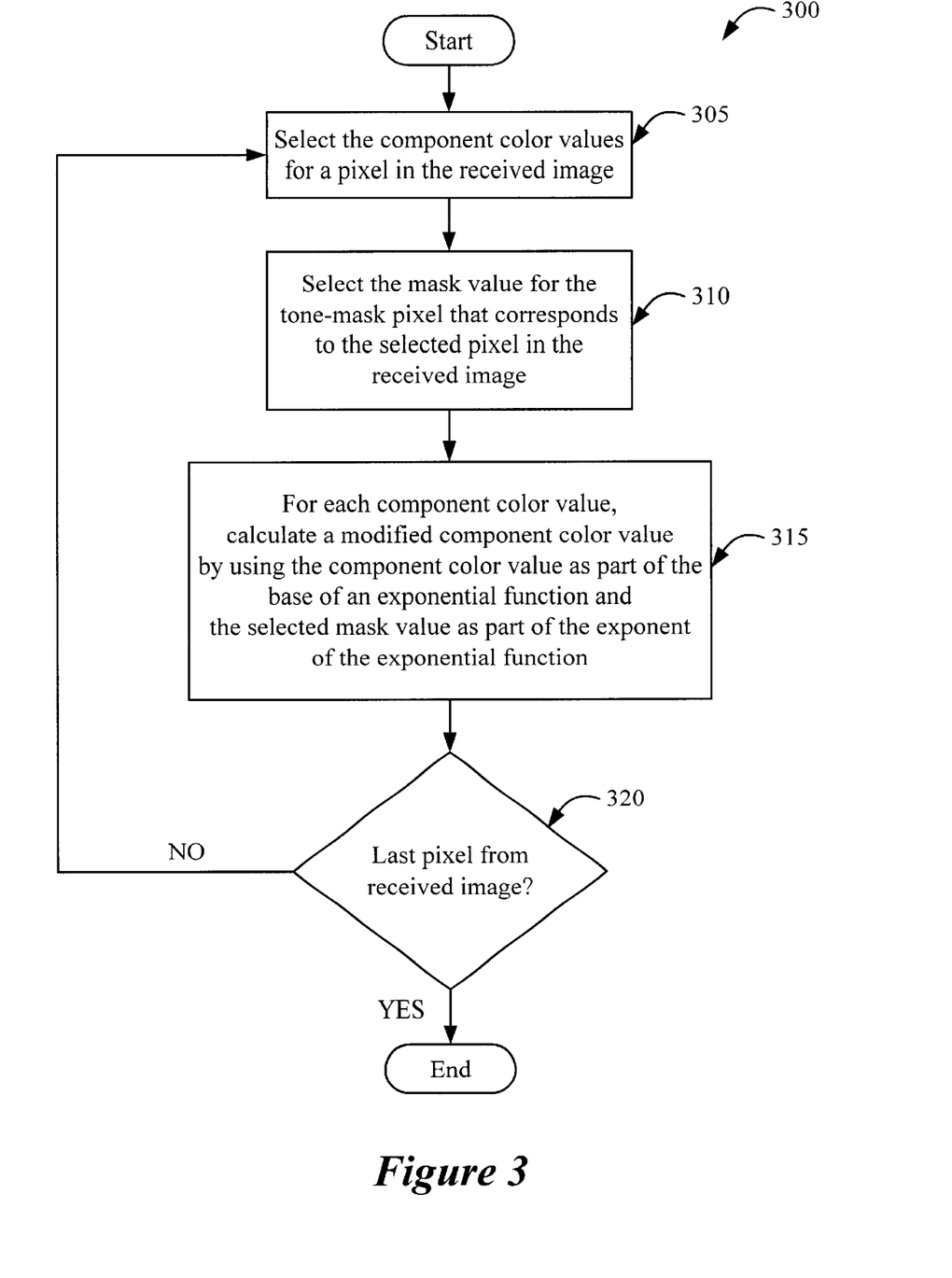
FIG. 3 illustrates a process for combining pixel values with their corresponding mask values from the tone-mask through a non-linear, exponential operation.

As discussed above, the invention uses the values in the tone-mask to modify the pixel values in the received image through a non-linear operation. FIG. 3 illustrates a process 300 for combining the pixel values with their corresponding mask values through a non-linear, exponential operation.

Process 300 initially retrieves (at 305) the component color values for a pixel in the received digital image. The process then retrieves (at 310) from the tone mask a mask value that corresponds to the selected component color values. Next, the process uses an exponential function to calculate (at 315) a modified component color value for each retrieved component color value. In some embodiments, the process uses a retrieved component color value as part of the base of the exponential function, and uses the retrieved mask value as part of exponent of this function.

Finally, the process determines (at 320) whether it has modified all the pixel color values in the received image. If not, the process repeats for the next pixel by returning to 305, and selecting the next component color value set for the next pixel. Otherwise, the process terminates.

Some embodiments of the invention use the following Equation A as the exponential function for modifying the component color values by their corresponding mask values.

$$O = 255 * \left(\frac{I}{255}\right)^{\left(2^{\left(\frac{C1*M-C2}{C2}\right)}\right)} \quad (A)$$

In this equation, O represents the modified output color value, I represents an input component color value, M represents the mask value, and C1 and C2 represent constant values. Some embodiments of the invention use Equation A for pixel values of each component color. For instance, some embodiments use this equation on red, green, and blue values of each pixel in the received image, in order to obtain modified red, green, and blue values for all the image pixels.

The operation performed by Equation A is essentially akin to performing a pixel-wise gamma correction (i.e., a pixel by pixel gamma correction), where each pixel has its own particular gamma value (due to its particular mask value) that is determined by the tonal properties of the pixel and its surrounding pixels. Equation A assumes an 8-bit image and therefore uses a value of 255 to scale the data. However, higher or lower bit-depth images could be used, in which case the scale value would correspond to the maximum digital count.

Figure 4:
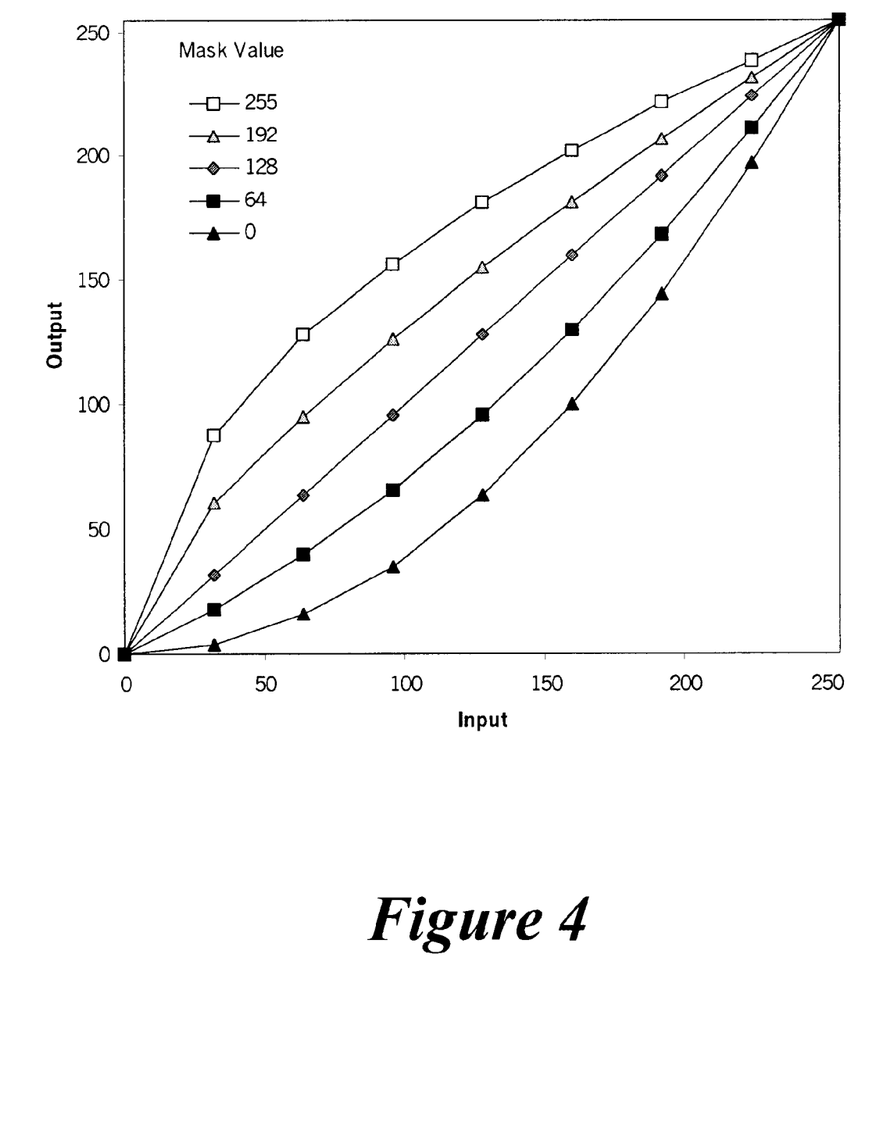
FIG. 4 illustrates several curves that show how pixel color values are mapped to output color values depending on the particular mask values.

Each mask value that is inserted in Equation A defines a tone-reproduction curve. In other words, for each mask value, a tone-reproduction curve can be used to represent how Equation A maps the input component color values to modified output color values. Similarly, a family of tone-reproduction curves can be used to illustrate this equation's mapping of the input values to the modified output color values for all mask values.

FIG. 4 illustrates a family of tone-reproduction curves for the case where the constant C1 equal 1, constant C2 equals 128, and the mask values range from 0 to 255. In this figure, the x-axis is the input pixel value and the y-axis is the output value. The mask values are in the range 0 to 255 when an eight-bit color scheme is used (i.e., when each component color is represented by eight bits). In this example, mask values greater than 128 result in an exponent less than 1, while mask values less than 128 yield exponents greater than 1. Mask values equal to 128 result in exponents equal to 1 and does not change the input data.

The constants C1 and C2 determine the center and width of the family of tone-reproduction curves. Specifically, the constant C2 determines the center of the family of curves. In the example shown in FIG. 4, the center is the 45° line representing the mask value 128. The constant C1 determines the spreading of the curves in the family. Hence, changing the constant C2 moves the family of curves up or down, while changing the constant C1 spreads or contracts the family of curves.

Some interactive embodiments of the invention (1) allow their users to modify C1 and C2, and/or (2) automatically modify one or both of these constants based on the image properties. Modifying these constants changes the magnitude of the power function. Hence, such modifications change the degree of local tone correction performed by process 300 based on user preferences or image properties. For instance, if a received original image is very bright, a user can move up the family of tone-reproduction curves so that the process can darken the original image more in order to provide better contrast between the bright objects in the image.

Figure 5:
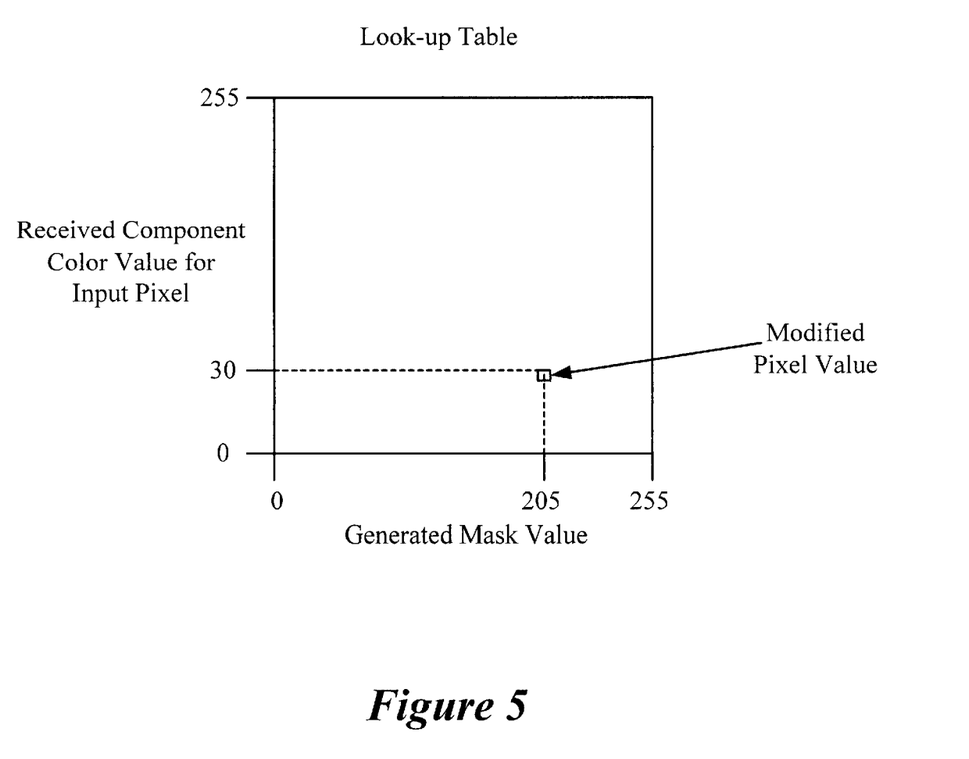
FIG. 5 presents a conceptual illustration of a two-dimensional look-up table that stores modified pixel color values.

Equation A can be implemented as a look up table, where the received pixel values and the generated mask values are used as indices into this table that identify the location of the pre-calculated modified pixel values for different combination of pixel and mask values. FIG. 5 presents a conceptual illustration of this approach.

Figure 6:
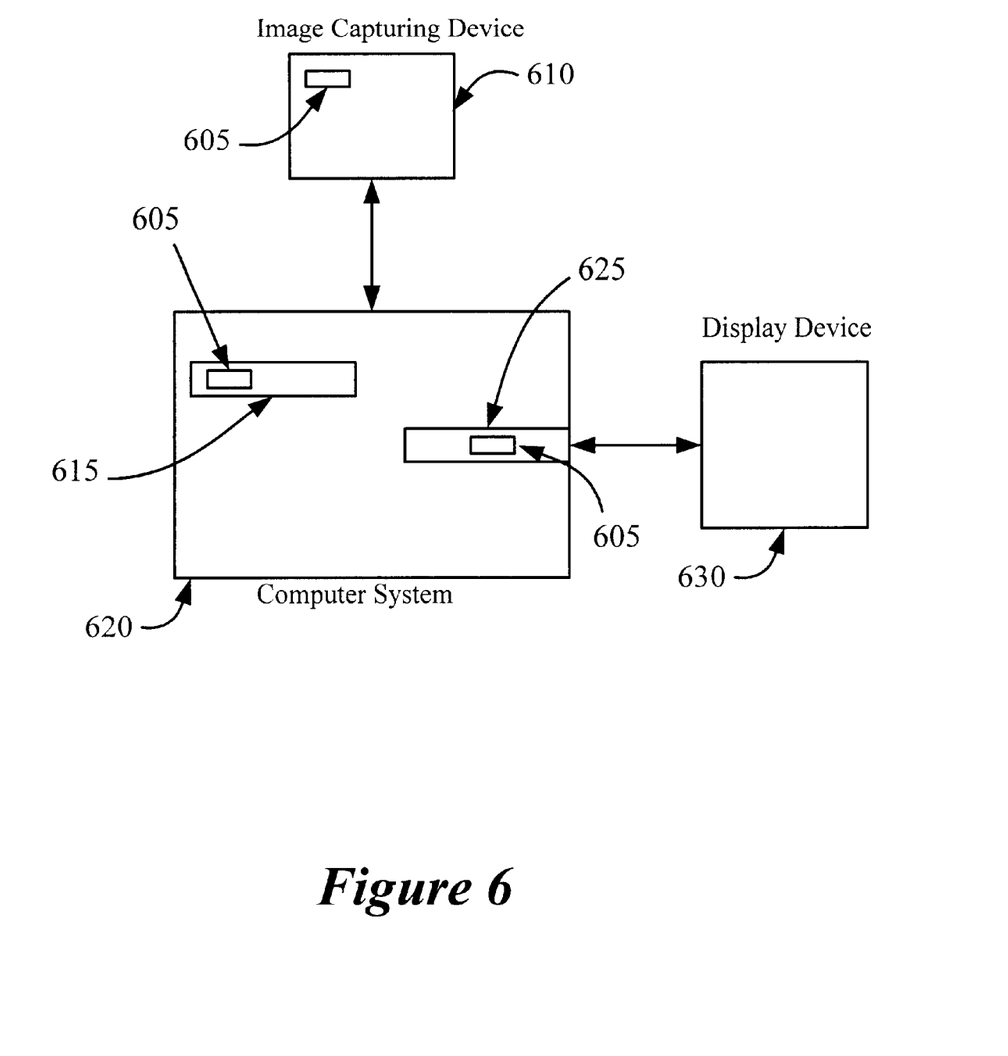
FIG. 6 illustrates several places in a computer and an image-capturing device for incorporating the invention.

The invention can be implemented at several stages in the image-processing pipeline. FIG. 6 illustrates several such stages. As shown in this figure, an image-capturing device 610 (e.g., a digital camera or a scanner) can use the invention's local-color-correction process 605 to improve the quality of the images captured by this device. The invention can be used to correct the color tone of images that were captured with uneven exposure or flash illumination. The invention can also be used to post-process images with a high dynamic range.

After capturing an image, the capturing device can quickly generate a tone-mask for the image by performing the fast and efficient process 200 of FIG. 2. The capturing device can then use a look-up table (such as the one conceptually illustrated by FIG. 5) to quickly identify the modified pixel values for each component color. In other words, the capturing device can use the original pixel values and the generated mask values as indices into the look-up table to retrieve modified pixel values.

As shown in FIG. 6, the invention's local-color-correction process 605 can also be part of an application 615 running on a computer system 620. The computer system can run this application to correct the color of an image captured by capturing device 610 or supplied by another application (such as a web browser application). The process 605 can also be implemented as part of a device driver 625 (such as a printer driver), so that the driver performs local-tone correction on an image before the display device 630 displays the image.

Figure 7:
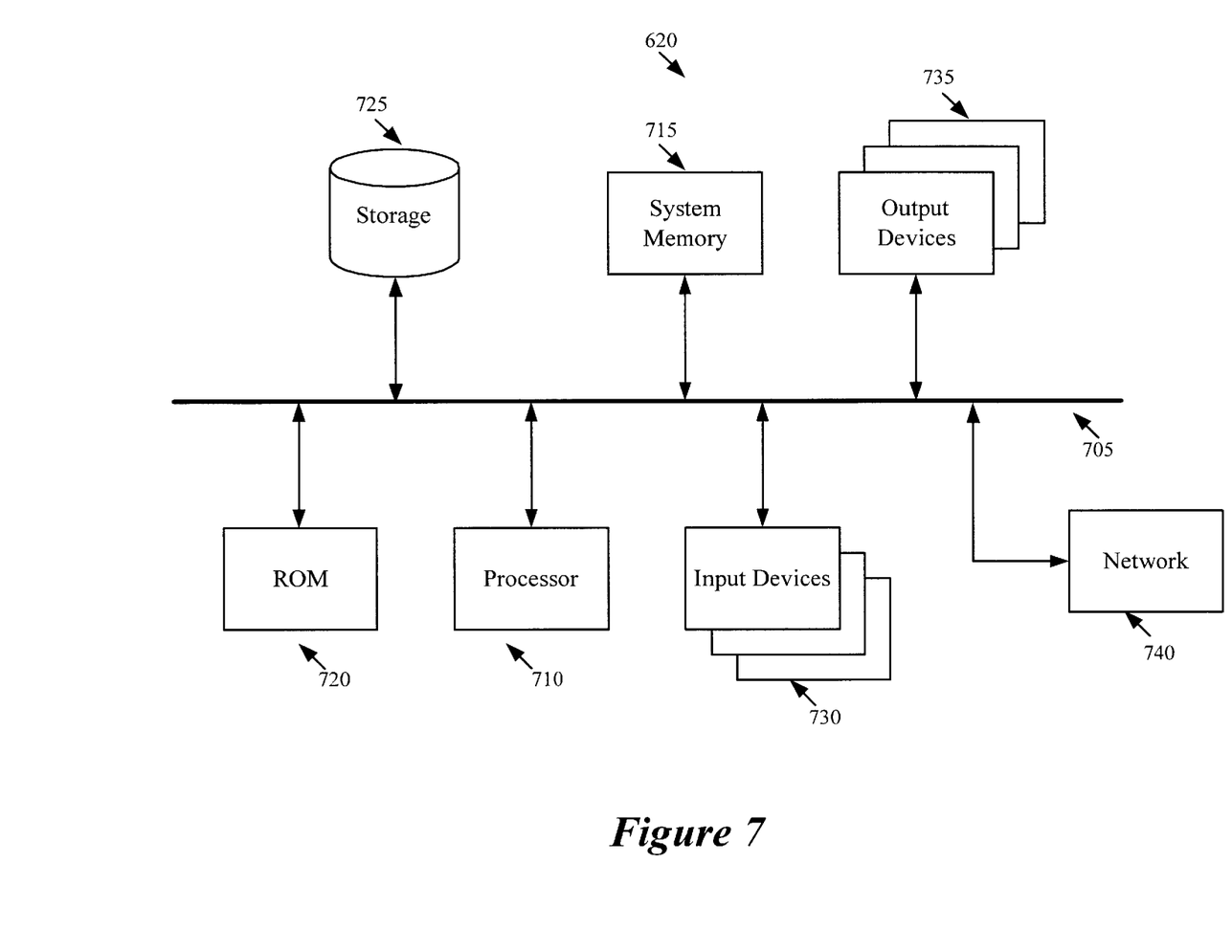
FIG. 7 illustrates a computer system used to implement some embodiments of the invention.

FIG. 7 presents a block diagram of a computer system 620 that is used in some embodiments of the invention. In some embodiments, the computer system 620 is separate from the image-capturing device 610. However, in other embodiments of the invention, this computer system 620 is part of the image-capturing device. Also, even though the computer system 620 is described below, one of ordinary skill will understand that other computer systems and architectures may be used in conjunction with the invention.

As shown in FIG. 7, the computer 620 includes a bus 705, a processor 710, a system memory 715, a read-only memory 720, a permanent storage device 725, input devices 730, and output devices 735. The bus 705 collectively represents all system, peripheral, and chipset buses that communicatively connect the numerous internal devices of the computer system 620. For instance, the bus 705 communicatively connects the processor 710 with the read-only memory 720, the system memory 715, and the permanent storage device 725. From these various memory units, the processor 710 retrieves instructions to execute and data to process.

The read-only-memory (ROM) 720 stores static data and instructions that are needed by the processor 710 and other modules of the computer system. The permanent storage device 725, on the other hand, is read-and-write memory device. This device is a non-volatile memory unit that stores instruction and data even when the computer 620 is off. Some embodiments of the invention use a mass-storage device (such as a magnetic or optical disk and its corresponding disk drive) as the permanent storage device 725. Other embodiments use a removable storage device (such as a floppy disk or zip® disk, and its corresponding disk drive) as the permanent storage device.

Like the permanent storage device 725, the system memory 715 is a read-and-write memory device. However, unlike storage device 725, the system memory is a volatile read-and-write memory, such as a random access memory. The system memory stores some of the instructions and data that the processor 710 needs at runtime. For instance, in some embodiments, the system memory 715 contains the look-up table that stores the modified pixel color values. Also, in some embodiments, the instructions necessary for carrying out the invention's process are stored in the system memory, the permanent storage device 725, and/or the read-only memory 720.

The bus 705 also connects to the input and output devices 730 and 735. The input devices enable the user to communicate information and select commands to the computer. The input devices 730 include alphanumeric keyboards and cursor-controllers. The output devices 735 display images generated by the computer. For instance, these devices display the modified digital images that the invention's local correction-techniques produce. The output devices include printers and display devices, such as cathode ray tubes (CRT) or liquid crystal displays (LCD).

Finally, as shown in FIG. 7, bus 705 also couples computer 620 to a network through a network adapter (not shown). In this manner, the computer can be a part of a network of computers (such as a local area network ("LAN"), a wide area network ("WAN"), or an Intranet) or a network of networks (such as the Internet).

The invention's local color-correction technique has numerous advantages. For instance, the invention's local correction can simultaneously lighten shadows and darken highlights, by using a simple pixel-wise "gamma" correction of the input data. Also, some embodiments balance global and local contrast changes and reduce chroma distortions by using an inverted, low-pass filtered, monochrome version of the original image as the tone mask.

In addition, the invention provides a simple and fast method of computing and applying local tone correction. Its local color correction provides a significant improvement in image quality relative to a global correction. Its correction is also on par with the correction offered by other local tone correction methods, such Retinex or derivative algorithms. However, unlike other local tone correction methods, the invention does not need to rely on complicated visual models or masks. In sum, the invention provides a simple, computationally efficient, and easily parameterized framework for performing local color corrections.

The invention's local tone correction can be useful for enhancing or improving a several types of images. For example, conventional photography may yield an image in which one region of the image is underexposed while another region is correctly exposed. Flash photography is another instance in which one region in the image may be over-exposed while another is under-exposed. For these situations, a complex local correction technique based on the human visual system may be inappropriate. In addition, some image scenes have a wide dynamic range. The invention's simple and fast local correction process provides an ideal solution to improve quickly the image quality in these situations.

Lastly, the invention's local-tone correction is a complementary technology to traditional pixel based processing. For example, once the invention is used to correct the color of an image, the image can be reproduced on a given printer using a traditional pixel based pipeline. Use of a neighborhood image processing technique for one part of the imaging pipeline does not exclude subsequent pixel based image processing. This suggests that pixel and neighborhood imaging operations could be used where appropriate to optimize the overall quality and speed of the imaging pipeline.

One embodiment of the invention is implemented by using the Adobe PhotoShop application. Specifically, in this embodiment, this application can be used to (1) input an original image, (2) copy the original image into a second layer, (3) blur the image using the Gaussian blur filter with a radius of about 15, (4) invert the blurred image, (5) desaturate the blurred negative using the Hue/Saturation adjustment, and (6) use the Soft Light layer operator to combine the original and generated images to create the final image. Experimenting with the radius of the Photoshop blur filter shows how the overall image contrast is a function of the radius. In particular, the larger the radius the better the overall contrast, but if the radius is too large then the local tone correction has less of an effect.

While the invention has been described with reference to numerous specific details, one of ordinary skill in the art will recognize that the invention can be embodied in other specific forms without departing from the spirit of the invention. For instance, in the embodiments described above, one monochrome mask is used to modify pixel values for all component colors. One of ordinary skill, however, will understand that other embodiments use separate masks for each component color. In these embodiments, each of the masks can be optimized for its component color value. Thus, one of ordinary skill in the art would understand that the invention is not to be limited by the foregoing illustrative details, but rather is to be defined by the appended claims.

We claim:

1. A method of performing local color correction comprising:
   (a) receiving an input image having a plurality of pixels, wherein each pixel of the input image is represented by a set of original pixel color values,
   (b) generating a tone-mask image from the input image, said tone-mask image having a plurality of pixels each represented by a set of pixel mask values, wherein each set of original pixel color values has a corresponding set of pixel mask values, and
   (c) determining a set of modified pixel color values for each set of original pixel color values, wherein each set of modified pixel color values equals a non-linear combination of a set of original pixel color values and its corresponding set of pixel mask values.

2. The method of claim 1 wherein determining a set of modified pixel color values includes using a set of original pixel color values and its corresponding set of pixel mask values as indices into a look-up table to retrieve the set of modified pixel color values.

3. The method of claim 1 wherein determining a set of modified pixel color values includes using a non-linear operation to combine a set of original pixel color values and its corresponding set of pixel mask values.

4. The method of claim 3 wherein the non-linear operation is not a subtraction or addition operation.

5. The method of claim 3 wherein the non-linear operation is an exponential operation having a base and an exponent, said operation using the set of original pixel color values as part of its base, and the corresponding set of pixel mask values as part of its exponent.

6. The method of claim 1 wherein generating the mask image includes using a non-iterative process.

7. The method of claim 1 wherein generating the tone-mask image includes performing a low-pass filtering operation on the input image.

8. The method of claim 7 wherein generating the tone-mask image further includes inverting the input image.

9. The method of claim 8 wherein generating the tone-mask image further includes converting the input image to a monochrome image.

10. The method of claim 1 wherein each set of original pixel color values is a set of component color values.

11. The method of claim 1 wherein each set of pixel mask values is a grayscale mask value.

12. A method of performing local color correction on an input image, said input image comprising a plurality of pixels, said method comprising:
   (a) receiving a set of original color values for a pixel of the input image,
   (b) generating a set of tone-mask values for the pixel of the input image, the set of tone mask values representing abbreviated color tone properties of the pixel independent of pixel content and identity; and
   (c) determining a set of modified pixel color values for the set of original color values, wherein the set of modified pixel color values equals a non-linear combination of the set of original color values and the set of tone-mask values.

13. The method of claim 12 further comprising:
   (a) receiving a set of original color values for each pixel of the input image;
   (b) generating a set of tone-mask values for each set of original color values; and
   (c) determining a set of modified color values for each set of original color values, wherein each set of modified color values equals the non-linear combination of a set of original color values and its corresponding set of mask values.

14. The method of claim 13 wherein determining a set of modified color values includes using a set of original color values and its corresponding set of mask values as indices into a look-up table to retrieve the set of modified color values.

15. The method of claim 13 wherein determining the set of modified color values includes using a non-linear operation to combine each value in the set of original color values with its corresponding mask value.

16. The method of claim 15 wherein the non-linear operation is an exponential operation having a base and an exponent, said operation using a value from the set of original color values as part of its base, and a value from the corresponding set of mask values as part of its exponent.

17. The method of claim 13 wherein generating the tone-mask values includes using a non-iterative process.

18. The method of claim 13 wherein generating the tone-mask values includes:

generating sets of monochrome color values from the sets of original color values, inverting the sets of monochrome color values, and performing a low-pass filtering operation on the sets of inverted, monochrome color values.

19. A computer readable medium having a set of instructions stored therein for enabling a computer to perform local color correction on an input image having a plurality of pixels, said set of instructions including:

(a) a first set of instructions, which when executed by the computer cause the computer to retrieve a set of original color values for each pixel of the input image, (b) a second set of instructions, which when executed by the computer cause the computer to generate a set of tone-mask values for each set of original color values, and (c) a third set of instructions, which when executed by the computer cause the computer to determine a set of modified color values for each set of original color values, wherein each set of modified color values equals a non-linear combination of a set of original color values and its corresponding set of mask values.

20. The computer-readable medium of claim 19 wherein the third set of instructions cause the computer to use a set of original color values and its corresponding set of mask values as indices into a look-up table to retrieve a set of modified color values.

21. The computer-readable medium of claim 19 wherein the third set of instructions cause the computer to use a non-linear operation to combine a set of original color values and its corresponding set of mask values.

22. The computer-readable medium of claim 21 wherein the non-linear operation is an exponential operation having a base and an exponent, said operation using the set of original color values as part of its base, and the corresponding set of mask values as part of its exponent.

23. The computer-readable medium of claim 19 wherein the second set of instructions generates the tone-mask values by using a non-iterative process.

24. The computer-readable medium of claim 19 wherein the second set of instructions includes:

a fourth set of instructions that cause the computer to generate sets of monochrome color values from the sets of original color values, a fifth set of instructions that cause the computer to invert the sets of monochrome color values, and a sixth set of instructions that cause the computer to perform a low-pass filtering operation on the sets of inverted, monochrome color values.

25. The computer-readable medium of claim 19 wherein each set of original color values is a set of component color values.

26. The computer-readable medium of claim 19 wherein each set of mask values is a grayscale mask value.

* * * * *